United States Patent
Crete

[15] 3,685,901
[45] Aug. 22, 1972

[54] COLOR ENLARGER SYSTEM

[72] Inventor: Darrel R. Crete, 2329 C St., Sacramento, Calif. 95816

[22] Filed: March 9, 1970

[21] Appl. No.: 17,825

[52] U.S. Cl. .....................355/38, 250/227, 350/96, 355/1, 355/35
[51] Int. Cl. ...........................................G03b 27/78
[58] Field of Search ...............355/35, 38, 1; 250/227; 350/96

[56] References Cited

UNITED STATES PATENTS

| | | | |
|---|---|---|---|
| 3,241,435 | 3/1966 | Craig et al. | 355/38 |
| 3,114,283 | 12/1963 | Gruner | 355/1 |

FOREIGN PATENTS OR APPLICATIONS

| | | | |
|---|---|---|---|
| 700,209 | 11/1940 | Germany | 355/68 |

Primary Examiner—Samuel S. Matthews
Assistant Examiner—E. M. Bero
Attorney—Boyken, Mohler, Foster & Schwab

[57] ABSTRACT

An arrangement of conventional elements in an enlarging system for eliminating the beam splitter and eliminating the mounting of photocells and sampling filters within the enlarger or in a unit with the compensating filters, and the provision for mounting a compact set of electrically-actuable compensating filters only on the lens mount of the enlarger for movement therewith, and respectively operatively connecting the lens mount and compensating filters with the sampling filters and control circuitry with a flexible light carrier and an electrical conductor wire whereby the enlarger will be entirely separate from the control circuitry and sampling filters except for the wire and carrier.

4 Claims, 4 Drawing Figures

PATENTED AUG 22 1972 3,685,901
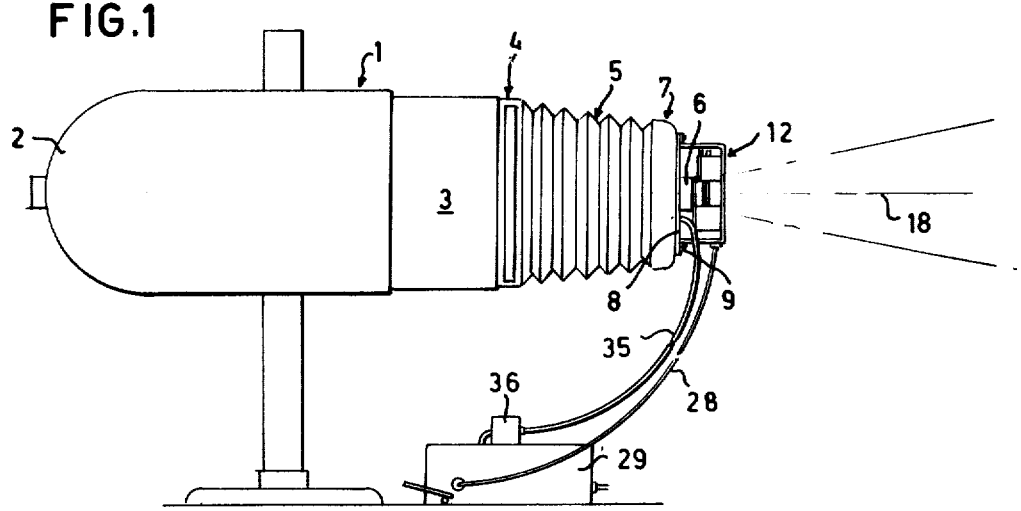
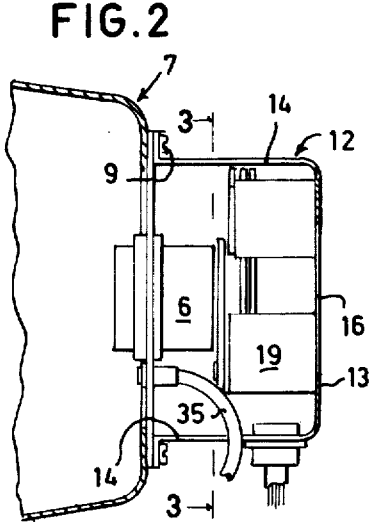
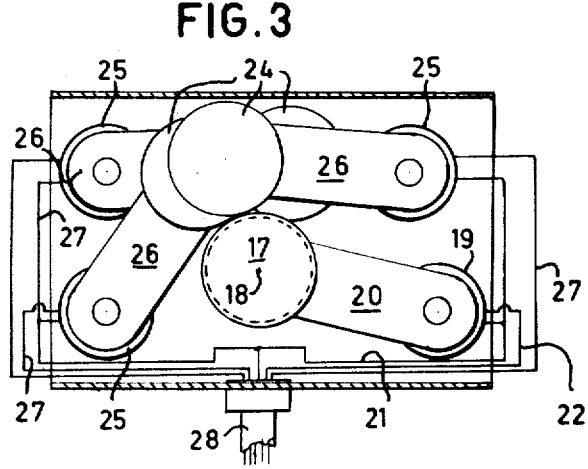
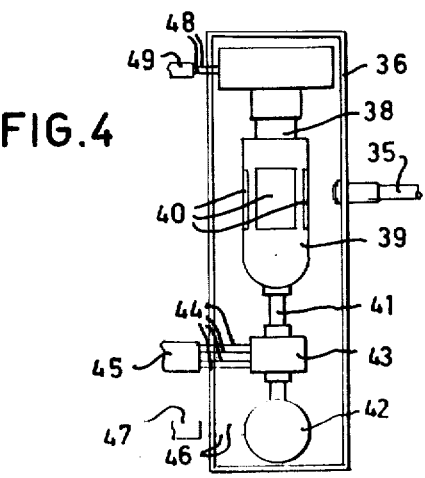
INVENTOR.
DARREL R. CRETE
BY
ATTORNEYS

COLOR ENLARGER SYSTEM

SUMMARY

Heretofore a conventional enlarger for making black and white enlargements has been successfully employed in the automatic making of color enlargements from color negatives by mounting a conventional color compensator, including its electrically-actuated color compensating filters, and motor-driven light sampling filters and a shutter in a position between and spaced from the enlarger lens and the paper. This unit, commonly known as a deck assembly, included a beam splitter for deflecting part of the light from the enlarger lens to the sampling filters, and required supporting it separately from the enlarger due to its bulk, weight and vibration from the motor. The light rays passing through the sampling filters are received by a photocell and a conventional electronic circuitry, separate from the enlarger, received information as to color distribution from the photocell, or photocells, and effects actuation of the shutter and compensating filters in the deck assembly to move them into and out of the path of light from the lens to expose the paper and to compensate for any irregularities in the color distribution. The electronic circuitry contains manually-actuated controls by which the operator may manually make adjustments to compensate for gross irregularities in the colors in a particular negative. In substantially normally exposed negatives, such manual controls are not employed, as compensation is automatically made for minor irregularities.

Prior to the above-described arrangement enabling the automatic making of enlargements by use of a conventional enlarger of the type used for making black and white enlargements, the automatic color enlargers were quite expensive and the maximum size color prints that could be made by the largest were 11 × 14 inches. Relatively few commercial finishers could afford the equipment required for the automatic making of the largest color enlargements, and in the absence of the employment of the deck assembly and electronic circuitry hereinbefore described, the excessive time of hours and even days involved in making test prints, trying different filter combinations, and visibly comparing the various prints to determine the truest colors, made the cost of producing larger color prints prohibitive.

The employment of the automatic color compensating deck assembly with a conventional enlarger of the type used for making black and white prints, is disclosed in my U.S. Pat. No. 3,507,574 April 21, 1970.

One of the objects of this invention is the provision of an arrangement in an enlarging system for eliminating the beam splitter and eliminating the mounting of detectors and sampling filters either within the enlarger or in a unit with the compensating filters, and instead provision is made for releasably mounting a small, compact, light-weight set of compensating filters, including a shutter, directly onto the lens mount for movement with the lens and mount during focussing, whereby the electronic control circuitry including the sampling filters may be positioned separate from the enlarger with the latter having no connection with the sampling filters and control circuitry other than a flexible electrical conductor and a flexible, cord-like conventional light carrier for carrying light from the mount adjacent to the lens to the sampling filters.

By the above arrangement, the unfiltered light from the enlargement lamp, after passage through the negative, is conducted to the sampling filters and photocell, thereby providing a stronger differentiation in the light sampled and more efficient response. Previously the light rays initially passed through the compensating filters and only a portion thereof was transmitted to the sampling filters.

Furthermore, by the new arrangement, the necessity for readjusting the position of the compensating filters relative to the enlarger lens is eliminated, the set of compensating filters and the shutter being carried by the lens mount in a fixed position relative to the enlarger lens.

In addition, the motor-driven sampling filters being separate from the enlarger completely eliminated any likelihood of motor vibration being transmitted to the lens.

The new structure and arrangement also enabled positioning the electronic control unit and the motor-driven sampling filters in any of many different positions relative to and spaced from the enlarger thus enabling the operator to enjoy the maximum freedom of movement in any dodging or other techniques he may wish to employ in the printing step, and to also make the most advantageous arrangement of the equipment in the space provided for the same.

A still further advantage in the improvement is that the compensating filters and shutter may be positioned uniformly closed to the enlarger lens than heretofore and the light that is transmitted to the sampling filters may be taken from a point in the housing closely adjacent to the lens.

The elimination of the beam splitter also enables the use of color negatives up to the maximum size the enlarger is capable of taking without impairing the projected image, a result not heretofore possible where the deck assembly was employed in combination with an enlarger for the miniature-sized film, such as 35 mm.

Other objects and advantages will appear in the description and drawings.

BRIEF DESCRIPTION OF THE DRAWINGS

FIG. 1 is a simplified side-elevational view of a horizontally-disposed conventional enlarger with a set of color compensating filters carried on the lens mount, and the electronic control unit and light sampling filters are shown separate and spaced from the enlarger but operatively connected with the latter.

FIG. 2 is an enlarged part cross-sectional view showing the color compensating filter unit on the lens mount of an enlarger, and showing the lens in elevation.

FIG. 3 is an elevational view of the compensating filters separate from the support therefor generally as viewed from line 3—3 of FIG. 2, the electrical circuit being diagrammatically indicated.

FIG. 4 is an elevational view of the motor-driven sampling filters and with the electrical conductors diagrammatically connected therewith, and with one end of the light carrier indicated.

DETAILED DESCRIPTION

The enlarger illustrated in FIG. 1 and generally designated 1 may be one of any conventional type of enlarger for making black and white prints, and is shown in a horizontal position for making greatly enlarged mural prints, inasmuch as the present invention enables making such prints, although it is equally capable of making smaller enlargements when positioned vertically.

Enlarger 1 comprises a lamp housing 2, containing the projection lamp, a condenser unit 3, negative holder 4, bellows 5 and a projection lens 6 supported on a lens mount generally designated 7. The lens mount may include a lens panel 8 carrying said lens, which panel is releasably secured in position by screws 9. The mount 7, including the lens as a unit therewith is supported for horizontal reciprocable movement for focussing the projected image on the printing paper.

The foregoing elements, as described, are common in enlargers and may be supported on one of different standards for different adjustments of the enlarger unit vertically and horizontally.

The white light from a lamp in the lamp housing 2 is condensed and passes through the negative in the negative holder and lens 6, and from the lens onto the printing paper.

Releasably secured on the lens panel 8 is a color compensator generally designated 12 that includes a vertical plate 13 (Fig. 2) spaced axially outwardly of the lens 6 by frame members 14 that, in turn, are releasably secured on the lens panel by screws 9 or any other suitable means. The plate 13 is in a plane perpendicular to the axis of lens 6, and is formed with a circular aperture 16 for passage of the light rays from the lens 6.

The color compensator 12 includes an opaque shutter 17 positionable in the path 18 of light when no exposure is being made. Shutter 17 is mounted on a solenoid 19 (FIG. 3) by a paddle 20 for movement out of the path 18 when solenoid 19 is activated by a suitable signal on wires 21, 22. Also included in the color compensator 12 are three filters 24 similarly mounted on solenoids 25 by paddles 26, but positioned out of the path 18. Each of the filters 24 is individually moved into path 18 and to a position extending across all of the rays of light from lens 6, when the solenoid upon which it is mounted has been activated by a suitable signal on wire 21 and one of the wires 27 associated with it. The three filters 24 are colored, each having a different one of the three primary colors. The wires 21, 22 and 27 may be conveniently combined to form a cable 28, and it is through the wires in this cable that the electronic control circuit in a housing 29 controls the actuation of the paddles 20, 26.

The electronic control circuit within the housing 29 may be of the type currently used in connection with commercial PAKO, EASTMAN, CRYODYNE and other printers, the latter distinguishing from the others in being a solid state circuitry, but the manner of operation is essentially the same. In the book entitled "Enlarging" Nineteenth Revised Edition, 1967, by C. I. Jacobson Ph.D. and L. A. Mannheim, M.A. (Oxon) and published by Focal Press, London & New York, on pages 306 to 311, conventional automatic color and exposure controls employing two sets of filters and electronic control circuits are also described.

One terminal end of a flexible conventional light carrying and transmitting wire 35 made up of cylindrical glass fibers, known in the trade as a "LIGHT WIRE," is secured within an aperture in the lens mount or lens panel 8 with the terminal end surface facing the negative holder (FIG 2). The wire 35 extends from the panel 8 to a point remote from the enlarger where the opposite terminal end is secured within the support 36 or housing for motor-driven sampling filters, (FIGS. 1, 4).

Referring to FIG. 4, the terminal end of the flexible light carrier on wire 35 is directed toward the detector, which detector comprises a photocell 38 about which is rotated a shell 39 having windows containing three filters 40. Each of the filters 40 is a different one of the three primary colors.

Shell 39 is mounted on a shaft 41 for rotation by a motor 42, said shaft passing through a sensor 43 by which a signal may be sent by wires 44 in cable 45 representing which of the three filters is in the path of light projected from the terminal end of the light carrier or wire 35 at any particular instant.

Motor 42 receives its power through wires 46 in cable 47, and as the filters 40 pass through or intercept the light projected from the light carrier 35, a sequency of signals representing the intensity of the light striking the photocell 38 are sent along wires 48 in cable 49 to the electronic control circuitry in the cabinet or housing 29 for determining the necessary actuation of filters 24 and to actuate them through the lines in cable 28 to provide the desired color balance in the print.

Different systems are employed in different automatic color printers, or the equivalent, one of which employs several photocells at least one being for each of the different colored filters, and sometimes a set of photocells and filters are duplicated, instead of employing a revolving shell and one photocell, but the signals transmitted to the electronic control means are substantially the same and the compensating filters are generally actuated in the same manner and for the same result. In such variations it is seen that more electrical conductors and light carriers may be required, but they may be combined in single cables or bundles similar to the combining of the wires in the present instance.

As has already been mentioned, the enlarger 1 may be vertical or horizontal, according to the size of the desired print, and the electronic control circuitry in housing 29 and the motor-driven sampling filters may be placed where most convenient, they being connected with the color compensator filter assembly 12.

In the making of prints by the present arrangement, the same lamp may be used for making the different sized prints from the relatively small enlargements of say 11 × 14 inches up to prints of the maximum width of available paper, which is in excess of 50 inches, inasmuch as there can be no variation in the distance between the compensating filters and the lens, and motor driving the sampling filters is separate from the enlarger and no vibration is transmitted to the enlarger. To obtain the desired exposure of the paper the actuation of the shutter and compensating filters is repeated a predetermined number of times, as may be discovered by making one or several test prints, and thereafter identical prints may be made in any desired number without re-focussing or readjustment.

The rapid automatic obtaining of the optimum color balance and definition possible in prints from perfect and imperfect color negatives of miniature sizes upward, and the duplication of such prints in enlargements up to and including mural sizes with enlarging equipment economically within reach of the average photo-finishing studio is accomplished by the present invention. The concept of utilizing the standard enlarging apparatus or the equivalent and affixing the color compensating filter assembly on the lens mount in fixed relation to the lens for movement therewith and physically separating the sampling filters and electronic circuitry from the enlarger so the lens and color compensating filters may be moved independently of and relative to the sampling filters and electronic actuating circuitry, yet providing the sampling filters with light directly from the enlarger for determining the necessary actuation of the filters, materially contribute to the accomplishment of the intended result. The color enlarging apparatus may be quickly adapted for making enlarged black and white prints merely by detaching the color compensating filters.

The light receiving terminal end of the light wire or carrier being offset to one side of the lens in no manner interfers with the light rays transmitted by the lens, and its position closely adjacent to the lens insures reception and transmission of light of substantially the same intensity and color characteristics as the image projected rays of light.

The commercially produced flexible light carrier 35 being made up of many microscopically small diameter linearly continuous glass fibers in a compact group or bundle insulated from each other by a glass coating of lower refractive index than that of the fiber against leakage of light from one to the other and transmit light from their light receiving to their light discharge ends by a process of total internal reflection. The ends of the bundle of fibers forming an assemblage of the glass fibers are bonded together and the entire bundle is encased in a flexible tubing of polyvinyl chloride or aluminum, according to the diameter of the bundle to protect the fibers. The degree of flexibility if dependent upon the diameter of the bundle of fibers forming the carrier, although in the larger diameter bundles within aluminum tubing bends about radii up to two and one-half inches are readily made while in the smaller diameter bundles the bends may be about radii of one-half to one inch. This flexibility is important in that it enables moving the light sampling filters relative to the enlarger or printer without disturbing the focus of the latter or the efficiency of the carrier.

Apart from the specific apparatus employed, the method involved may be said to be one in which the light from a conventional enlarging lamp is transmitted, in succession, through the color negative and through an enclosed space and through an image projecting lens for projection of the image onto the printing paper, and conducting a portion of said light from a light receiving point positioned within said space closely adjacent to and alongside said lens, one of said space through an enclosed path within a light carrier to a discharge point remote from said space and separate from the lamp, negative and lens for discharge of the light from the carrier at said discharge point. The printing characteristics of the light projected from the carrier at said discharge point is instantaneously measured with respect to predetermined colors of filters at the light sampling means by the photocell and the measures so taken are electronically translated in the electronic circuitry within housing 27 into modifying time determinates required for positioning across the light projected from said lens different transparent color filters corresponding to said predetermined colors and then such necessary filters are electronically and automatically interposed across the light rays projected from the lamp at time durations corresponding to said time determinates which the colors in the print developed on the paper will be balanced.

I claim:

1. The method of making enlarged color prints from a color negative spaced between an enlarging lamp and an image projecting lens within an enclosed path between said lamp and said lens for the formation and projection of the light image of said negative by said lens onto printing paper, that includes the steps of:

a. transmitting the light from said lamp through said color negative into and across the space between said negative and said lens and through the latter for said projection onto said paper, b. conducting a portion of the light transmitted into said space direct from said negative and from a point spaced from said negative and closely adjacent said projection lens through an enclosed path within a light carrier to a discharge point remote from said space and separate from said lamp, negative and lens for discharge of said light from said carrier at said discharge point, space c. substantially instantaneously electronically measuring the printing characteristics of the light rays discharged at said discharge point and with respect to a predetermined number of different colors, electronically translating said measures into modifying time periods required for positioning across the light discharged from the lens different color filters necessary for rectifying color imbalances in the rays to be projected to said paper, and electronically and automatically interposing across the light rays projected from said lens, transparent color filters each corresponding to one of the colors of said predetermined number, at time durations corresponding to said time periods whereby the colors in the print developed on said paper will be balanced, each of said time durations being a succession of uniform time exposures the sum of which is equal to the total of each period.

2. In combination:

a. A color compensator for correcting color imbalance in the printing light passed, in turn, through a color negative and along a path to a projection lens for projection therefrom including a plurality of color-compensating filters of different colors, and electrically actuatable filter-supporting means supporting each filter for movement from inoperative positions to and from a common aligned operative position, b. a set of light-sampling filters respectively corresponding in color to those of said color-compensating light filters and photocell means adjacent to said light-sampling filters for receiving light passed through said light-sampling filters, c. an electronic control unit electrically connected with said color compensator and photocell means for moving said color compensating filters to said common position to automatically adjust the color balance of such printing light when said printing light is passed through said compensating filters at said common position, d. a flexible elongated wire-like light carrier for conducting the printing light when directed against one terminal end therethrough to the opposite terminal end for discharge from said opposite end in a direction longitudinally of said carrier and outwardly thereof, and means for supporting said one terminal end in a position facing such negative to receive printing light direct from said negative, and e. means for supporting said opposite terminal end in a position facing said sampling filters for discharge of light conducted through said carrier on said sampling filters for passage therethrough onto said photocell means.

3. In a combination as defined in claim 2;

f. said means for supporting said one terminal end comprising a lens panel having an aperture for supporting such projection lens therein on a photoenlarger that includes a negative holder for supporting a color negative in space opposed relation to one side of said panel, g. said one terminal end of said carrier being supported on said panel at said one side of said panel directly facing said negative holder and adjacent to said aperture for receiving light transmitted through a color negative on such negative holder directly therefrom, and h. means supporting said color compensator on the opposite side of said panel independently of and spaced from said sampling filters.

4. In combination with an enlarger for making enlarged photo prints from a negative, which enlarger includes a source of printing light, light-projecting lens spaced from said source for projecting said printing light along a path to printing paper, walls defining the sides of an enclosed passageway for light between said source and said lens, an end wall supporting said lens at one end of said passageway, and a negative holder intermediate said source and said lens for supporting a color film in a position extending across said passageway with a space between said negative and said lens:

a. a color compensator for correcting color imbalance in the printing light projected from said lens including a plurality of color compensating filters of different colors and electrically actuatable filter supporting means supported on said enlarger outwardly of said end wall relative to said space for movement to and from inoperative positions at one side of said path to operative positions extending across said path, b. a set of light-sampling filters corresponding in color to said compensating filters and photocell means adjacent to said light-sampling filters for receiving light passed through said light-sampling filters onto said photocell means, c. an electronic control unit including said sampling filters and said photocell means spaced from and supported independently of said enlarger electrically connected with said color compensator and photocell means for moving said compensating filters from said inoperative positions to said operative positions to automatically rectify said color imbalance of said printing light according to the requirements of the negative on said negative holder upon light from said negative being directed through said sampling filters onto said photocell means, d. an elongated flexible wire-like light carrier extending from said enlarger to said sampling filters having one terminal light receiving end positioned within said space in said passageway spaced from and directed toward said negative holder for receiving light directly from said source after passage thereof through said negative, and the opposite end of said carrier extending to said light-sampling filters and directed toward said sampling filters for discharging the light carried from within said space through said sampling filters and onto said photocell means, whereby the position of said control unit and said enlarger relative to each other may be varied within the limits of the flexibility of said light carrier and the electrical connection between said color compensator and photocell means, without effecting the operation of said color compensator and said control means, e. means on said end wall for supporting said light receiving end facing into said space in a position closely adjacent to said lens, and f. means for supporting said color compensator on said end wall in fixed relation relative to said lens, whereby said color compensating filters will remain in the same position relative to said lens during movement of said lens to different positions.

* * * * *